A. C. STANTZ.
DEMOUNTABLE RIM.
APPLICATION FILED SEPT. 20, 1920.
1,415,272.
Patented May 9, 1922.
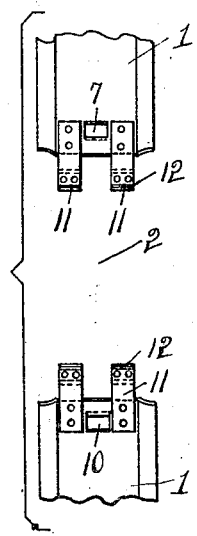
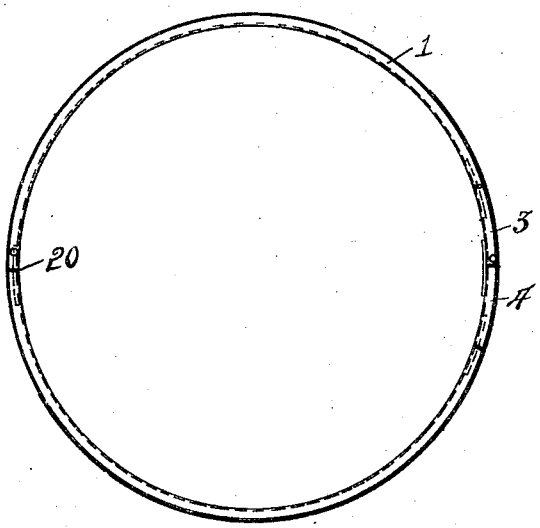
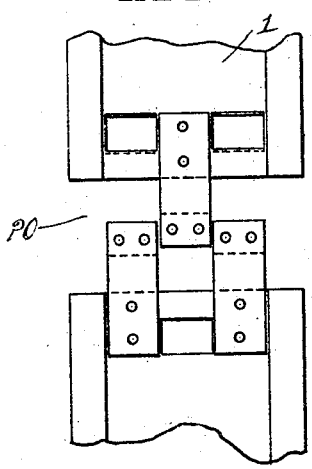
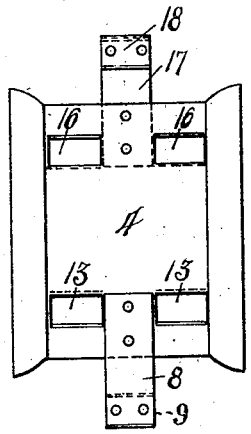
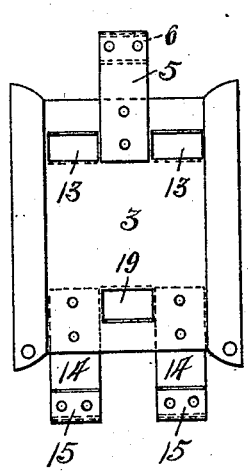
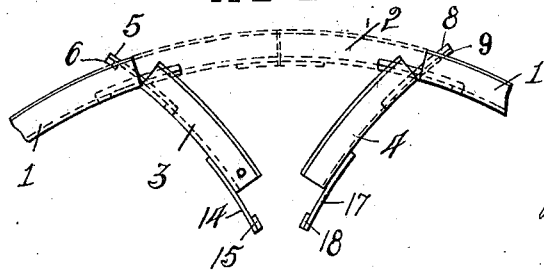
INVENTOR
Alfred C. Stantz.
By Owen Owen & Crampton
His attys.

UNITED STATES PATENT OFFICE.

ALFRED C. STANTZ, OF DETROIT, MICHIGAN.

DEMOUNTABLE RIM.

1,415,272.   Specification of Letters Patent.   Patented May 9, 1922.

Application filed September 20, 1920. Serial No. 411,480.

*To all whom it may concern:*

Be it known that I, ALFRED C. STANTZ, a citizen of the United States, and a resident of Detroit, in the county of Wayne and State of Michigan, have made an Invention Appertaining to Demountable Rims; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to demountable rims for pneumatic tires, and has for its object the provision of a rim of this character of simple and efficient construction, and comprising a plurality of segmental sections adapted to have interlocking engagement at their adjacent ends to facilitate assembling or separation of the sections as it may be desired to secure a tire thereon or remove it therefrom.

The invention is fully described in the following specification, and while, in its broader aspect, it is capable of embodiment in numerous forms, a preferred embodiment thereof is illustrated in the accompanying drawings, in which,—

Figure 1 is a side elevation of a rim embodying the invention. Fig. 2 is a fragmentary face view of the open portion of the rim with the locking sections removed. Fig. 3 is a fragmentary face view of the rim showing a joint thereof in separated relation. Figs. 4 and 5 are face views of the cooperating locking sections of the rim, and Fig. 6 is a fragmentary edge view of the rim with the locking sections shown drawn inwardly in partly removed relation to the rim.

Referring to the drawings. 1 designates one section of a tire rim of the demountable type and transversely split with its ends separated to provide an open space 2 therebetween, which is filled by two segmental locking rim sections 3 and 4, preferably of the same length.

The section 3, in the present instance, is provided at its outer end with respect to the other section with a single longitudinally projecting finger or spur 5 centrally disposed transversely thereof and provided at its end with a lug or knuckle 6 projecting inward toward the rim axis. This finger is adapted to lap the outer side of the adjacent rim section end, and when so lapped, and the sections are in end abutment, the knuckle 6 of the finger enters a registering opening 7 in the section 1. The outer end of the section 4 is provided with a similar finger 8, which is adapted to lap the outer side of the adjacent end of the rim section 1 and has a knuckle 9 which enters a registering opening 10 in the section 1 when the sections 1 and 4 are in end abutment and in circular alignment.

Each end of the rim section 1 has a pair of transversely spaced fingers 11 projecting longitudinally therefrom at opposite sides of the respective locking section finger 5 or 8, as the case may be, and provided at their free ends with inwardly projecting lugs or knuckles 12 adapted to enter registering openings 13 in the outer end portion of the adjacent locking section 3 or 4. It is thus evident that the knuckled fingers on the adjacent ends of the section 1 and locking sections cooperate with the holes therein to provide an interengaging means for preventing endwise movement of the assembled parts.

The inner or adjacent ends of the locking sections 3 and 4 are adapted to be locked together against relative endwise movement in the same manner as the large and small sections except that the locking fingers at the inner ends of the sections lap the inner sides thereof. For this purpose the section 3 has a pair of fingers 14 projecting in transversely spaced relation longitudinally from the inner end thereof in position to lap the inner side of the section 4 and have spurs or knuckles 15 at the free ends thereof entering openings 16 in the section 4. The section 4 has a single finger 17 projecting from its inner end in position to lap the inner side of the section 3 between the fingers 14, 14 and to have an outwardly projecting spur or knuckle 18 at its free end enter a socket or opening 19 in the other section.

It is evident by reference to Fig. 6 that to assemble the rim sections the latter are placed in inwardly projecting relation with respect to the section 1 with their outer ends bearing against the respective ends thereof. Upon an outward turning movement of the locking sections from this position into circular alignment with the section 1, the knuckled fingers at the outer ends of the locking sections and the ends of the section 1 enter the openings in the respective parts, while the fingers 14 and 17 at the inner ends of the sections swing outward into position for their knuckles to enter the registering openings in the respective sections. At the same time the inner ends of the locking sections coact and cause the sections to act in the manner of a toggle to expand the rim into firm engagement with a tire disposed therearound.

If desired, the rim section 1 may be provided with a joint 20 opposite the opening 2 to permit a collapsing of the opposite side portions of the main rim section when the locking sections are removed therefrom and thereby facilitate the removal of a rim from or its insertion into a tire. In the present instance, the ends of the rim section 1 at the joint 20 are shown as interconnected in the same manner as described for the interconnection of one of the locking sections with the rim section, as illustrated in Fig. 3.

I wish it understood that my invention is not limited to any specific construction, arrangement, or form of the parts, as it is capable of numerous modifications and changes, without departing from the spirit of the claims.

Having thus described my invention, what I claim as new, and desire to secure by Letters Patent, is,—

1. A rim of the class described, having a plurality of sections adapted to have end abutment, one section having a pair of sockets adjacent to its end and the other section a single socket adjacent to its end, a pair of angled fingers projecting from the end of the section having a single socket and adapted to lap the end of the adjoining section and to enter the sockets thereof, and a single angled finger projecting from the end of the other section and adapted to lap the end of the adjoining section between the fingers thereof and to enter the socket in the lapped section.

2. A rim of the class described, having a main section with an opening between its ends, and a pair of locking rim sections disposed end to end in the main section opening in abutment at their outer ends with the main section ends, an angled finger projecting longitudinally from the main section ends in lapping relation to the outer ends of the locking sections and in interengagement therewith to prevent longitudinal separation thereof, an angled finger projecting longitudinally from the outer end of each locking section in lapping relation to the abutting end of the main section and interengaging therewith to prevent longitudinal separation of the parts, and a finger projecting from the inner end of each locking section in lapping relation to the inner side of the adjacent end of the other locking section and interengaging with the sections to prevent longitudinal separation thereof but permitting an inward swinging of the inner ends of the locking sections relative to the main section.

3. A rim of the class described, having a main section with its ends separated to provide an opening therebetween, a pair of endwise abutting locking sections disposed within the main section opening to fill the same, an angled finger projecting longitudinally from each main section end and lapping the abutting locking section end at the outer side thereof and having inward hooked engagement therewith, and an angled finger projecting from the inner end of one of the locking sections in lapping relation to the adjacent end of the other locking section at its inner side and having outward hooked engagement therewith whereby a separation of the locking sections from each other and from the main section may be effected by an inward drawing of the abutting ends of the locking sections.

4. A rim of the class described having a main section with its ends separated to provide an opening therebetween, a pair of locking rim sections disposed in endwise abutment within the main section opening to fill the same, an angled finger projecting from the outer end of each locking section in lapping relation to the outer side of the adjacent main section end and having inward hooked engagement therewith, and a finger projecting from the inner end of one of the locking sections in lapping relation to the adjacent end of the other locking section at the inner side thereof and having outward hooked engagement therewith whereby a separation of the locking sections from each other and from the main section ends may be effected by an inward movement of the inner ends of the locking sections, and vice versa.

In testimony whereof I have hereunto signed my name to this specification.

ALFRED C. STANTZ.